United States Patent
Ohkuni et al.

(10) Patent No.: US 6,210,593 B1
(45) Date of Patent: Apr. 3, 2001

(54) ETCHING METHOD AND ETCHING APPARATUS

(75) Inventors: Mitsuhiro Ohkuni, Nara; Masafumi Kubota, Osaka, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/019,200

(22) Filed: Feb. 5, 1998

(30) Foreign Application Priority Data

Feb. 6, 1997 (JP) .................................................. 9-023757

(51) Int. Cl.⁷ .................................................... G01L 21/30
(52) U.S. Cl. ................................. 216/59; 216/2; 216/58; 216/59; 216/67; 216/72; 438/9; 438/14; 250/305; 250/307
(58) Field of Search ................................. 216/2, 58, 59, 216/67, 72; 438/9, 14; 250/305, 307

(56) References Cited

U.S. PATENT DOCUMENTS

| | | |
|---|---|---|
| 5,406,080 | 4/1995 | Friedhelm . |
| 5,450,205 | 9/1995 | Sawin et al. . |
| 5,721,090 * | 2/1998 | Okamoto et al. ..................... 430/313 |
| 5,753,886 * | 5/1998 | Iwamura et al. ................ 219/121.43 |
| 5,759,424 * | 6/1998 | Imatake et al. ......................... 216/60 |
| 5,767,021 * | 6/1998 | Imai et al. ............................ 438/719 |

* cited by examiner

Primary Examiner—Samuel A. Acquah
(74) Attorney, Agent, or Firm—McDermott, Will & Emery

(57) ABSTRACT

In etching a target film to be etched antecedently, an etching rate is measured at each of the peripheral and central portions of the target film. If the etching rate is higher at the peripheral portion of the target film to be etched antecedently than at the central portion thereof, a focus ring positioned around a wafer is moved upward in etching a target film to be etched subsequently, so that the quantity of radicals arriving at the peripheral portion of the target film to be etched subsequently is decreased. If the etching rate is lower at the peripheral portion of the target film to be etched antecedently than at the central portion thereof, the focus ring is moved downward in etching the target film to be etched subsequently, so that the quantity of radicals arriving at the peripheral portion of the target film to be etched subsequently is increased.

8 Claims, 9 Drawing Sheets

ETCHING METHOD AND ETCHING APPARATUS

BACKGROUND OF THE INVENTION

The present invention relates to an etching method whereby a target film, such as a metal alloy film, formed on a wafer is etched by using a plasma in the process of manufacturing a semiconductor device and to an etching apparatus used in the etching method.

A method of generating a plasma by utilizing RF discharge has found a wide range of applications in such fields as plasma etching for micro-fabrication and plasma CVD for thin-film formation, each conducted in a semiconductor process. In particular, the field of plasma-assisted dry etching has required the establishment of a dry-etching technique which promises a high-precision and stable etching process with improved reproducibility, productivity, and yield.

In the field of dry etching performed with respect to a target film such as a metal alloy film, a method of reactive ion etching (RIE) has been used predominantly.

A description will now be given to a conventional plasma-etching apparatus.

FIG. 8 shows the schematic structure of the conventional RIE plasma-etching apparatus. A chamber 1 maintained under vacuum is internally provided with a sample stage 3 for carrying a wafer 2 as a sample to be etched. For example, RF power of 13.56 MHz is applied from an RF power source 4 to the sample stage 3, which also serves as a lower electrode. The chamber 1 is formed with a gas inlet 5 for introducing reactive gas into the chamber 1 and with a gas outlet 6 for exhausting the reactive gas from the chamber 1. On the sample stage 3, there is provided a focus ring (equalizer ring) 7 with a height of 10 to 20 mm, which is positioned around the wafer placed on the sample stage 3 to equalize the distribution of radicals composed of reactive gas and directed to a target film on the wafer 2.

In the conventional process of etching the target film such as a metal alloy film, optimum etching conditions under which the uniformity of the etching rate is ±5% are predetermined so that the target film is etched under the optimum etching conditions.

To optimize the etching conditions, there have been adopted a method of replacing the focus ring 7 with another of a different height and a method of controlling the direction in which the reactive gas blows into the chamber 1. Briefly, the level of the focus ring 7 and the direction of the blowing gas are varied during actual etching till the optimum level and direction that provide the optimum etching rate are achieved.

Table 1 shows an example of etching conditions for dry etching performed with respect to a metal alloy film.

TABLE 1

| PARAMETER | VALUE |
| --- | --- |
| POWER (13.56 MHz) | 700 W |
| GAS SPECIES ($BCl_3/Cl_2/N_2$) | 100/100/20 sccm |
| PRESSURE | 150 mTorr |

FIG. 9(a) shows the cross-sectional structure of a sample before dry etching is performed. FIG. 9(b) shows the cross-sectional view of the sample after dry etching was performed. As shown in FIG. 9(a), a BPSG film 11, a first TiN film 12, an Al-1% Cu film 13, and a second TiN film 14 are successively deposited on a semiconductor substrate 10 made of silicon. A resist pattern for forming a pattern with a 0.7 µm line width is formed on the second TiN film 14. When dry etching is performed with respect to the second TiN film 14 and Al-1% Cu film 13 masked with the resist pattern 15 under the etching conditions shown in Table 1, a metal wire 16 with a 0.7 µm line width is formed as shown in FIG. 9(b).

Table 2 shows the relationship between the number of processed wafers with a diameter of 8 inches and the etching rate.

TABLE 2

| | UNIFORMITY OF ETCHING RATE (%) | |
| --- | --- | --- |
| | WHEN PROCESS IS STABLE | WHEN PROCESS IS UNSTABLE |
| 1ST WAFER | ±3.9 | ±4.0 |
| 5TH WAFER | ±4.8 | ±8.0 |
| 10TH WAFER | ±4.1 | ±5.3 |
| 15TH WAFER | ±4.6 | ±10.9 |
| 20TH WAFER | ±4.3 | ±8.7 |
| 25TH WAFER | ±4.6 | ±4.5 |

As shown in Table 2, when the number of processed wafers is small and the etching process is stable, the uniformity of the etching rate remains within ±5% for each of 6 wafers selected from 25 wafers and examined for the etching rate. However, as the number of processed wafers increases and the conditions in the reaction chamber change, the etching process becomes unstable. When the etching process is unstable, the uniformity of the etching rate becomes ±5% or more, as indicated by the 5th, 15th, and 25th wafers, resulting in a reduced etching rate.

Although the foregoing data represents the relationship between the number of processed wafers with a diameter of 8 inches and the etching rate, the aforesaid tendency is more noticeable in the case of performing etching with respect to wafers with a diameter of 12 inches. In other words, the non-uniformity of the etching rate is more conspicuous with wafers larger in diameter.

However, even when the uniformity of the etching rate is degraded, the conventional etching method continues etching without changing etching conditions. It is not until the problem arises that the focus ring is replaced with another of a different height or the direction of the blowing reactive gas is changed after the pressure inside the reaction chamber is switched from the vacuum state to an atmospheric state.

As a result, the reliability of a semiconductor device becomes less stable and the yield lowers due to the degraded uniformity of the etching rate.

SUMMARY OF THE INVENTION

It is therefore an object of the present invention to prevent the lowering of the reliability and yield of a semiconductor device resulting from the non-uniformity of the etching rate.

To attain the above object, the present invention has been achieved by focusing attention on the fact that plasma etching is predominantly performed by radicals and the non-uniformity of the etching rate at a target film mostly results from different quantities of radicals supplied to the peripheral and central portions of the target film being etched. According to the present invention, the etching rate is measured at the peripheral and central portions of each target film and the quantities of radicals supplied thereto are controlled, whereby a uniform etching rate is achieved at each target film.

An etching method according to the present invention is for sequentially etching target films formed on respective wafers by using a plasma and comprises: an etching-rate measuring step of measuring an etching rate at each of peripheral and central portions of the first target film formed on the first wafer; and a radical-quantity controlling step of controlling a quantity of radicals by increasing the quantity of radicals arriving at a central portion of the second target film formed on the second wafer to be etched subsequently to the first wafer or decreasing the quantity of radicals arriving at a peripheral portion of the second target film when the etching rate is higher at the peripheral portion of the first target film than at the central portion thereof or controlling the quantity of radicals by decreasing the quantity of radicals arriving at the central portion of the second target film or increasing the quantity of radicals arriving at the peripheral portion of the second target film when the etching rate is lower at the peripheral portion of the first target film than at the central portion thereof.

In accordance with the etching method according to the present invention, the quantity of radicals is controlled by increasing radicals arriving at the central portion of the second target film being etched or decreasing the quantity of radicals arriving at the peripheral portion of the second target film being etched when the etching rate is higher at the peripheral portion of the first target film than at the central portion thereof. Consequently, the quantity of radicals arriving at the central portion of the second target film in the etching process is relatively increased compared with the quantity of radicals supplied to the central portion of the first target film in the etching process, so that the etching rate at the central portion of the second target film is increased, resulting in a uniform etching rate. On the other hand, the quantity of radicals is controlled by decreasing the quantity of radicals arriving at the central portion of the second target film being etched or increasing the quantity of radicals arriving at the peripheral portion of the second target film being etched when the etching rate is lower at the peripheral portion of the first target film than at the central portion thereof. Consequently, the quantity of radicals arriving at the peripheral portion of the second target film in the etching process is relatively increased compared with the quantity of radicals arriving at the peripheral portion of the first target film in the etching process, so that the etching rate at the peripheral portion of the second target film is increased, resulting in a uniform etching rate achieved at the second target film.

In the etching method according to the present invention, the radical-quantity controlling step preferably comprises the step of decreasing the quantity of radicals arriving at the peripheral portion of the second target film by upwardly moving a focus ring positioned around the second wafer to be vertically movable relative to the second wafer when the etching rate is higher at the peripheral portion of the first target film than at the central portion thereof.

The arrangement decreases the quantity of radicals arriving at the peripheral portion as well as the etching rate at the peripheral portion, so that a uniform etching rate is achieved at the second target film.

In the etching method according to the present invention, the radical-quantity controlling step preferably comprises the step of increasing the quantity of radicals arriving at the peripheral portion of the second target film by downwardly moving a focus ring positioned around the second wafer to be vertically movable relative to the second wafer when the etching rate is lower at the peripheral portion of the first target film than at the central portion thereof.

The arrangement increases the quantity of radicals arriving at the peripheral portion as well as the etching rate at the peripheral portion, so that a uniform etching rate is achieved at the second target film.

In the etching method according to the present invention, the radical-quantity controlling step preferably comprises at least one of the steps of decreasing the quantity of radicals arriving at the peripheral portion of the second target film by decreasing the amount of reactive gas arriving at the peripheral portion of the second target film and increasing the quantity of radicals arriving at the central portion of the second target film by increasing the amount of reactive gas arriving at the central portion of the second target film when the etching rate is higher at the peripheral portion of the first target film than at the central portion thereof.

The arrangement achieves a uniform etching rate at the second target film through mere control of the amount of reactive gas.

In the etching method according to the present invention, the radical-quantity controlling step preferably comprises at least one of the steps of increasing the quantity of radicals arriving at the peripheral portion of the second target film by increasing the amount of reactive gas arriving at the peripheral portion of the second target film and decreasing the quantity of radicals arriving at the central portion of the second target film by decreasing the amount of reactive gas arriving at the central portion of the second target film when the etching rate is lower at the peripheral portion of the first target film than at the central portion thereof.

The arrangement achieves a uniform etching rate at the second target film through mere control of the amount of reactive gas.

In the etching method according to the present invention, the etching-rate measuring step preferably comprises the step of measuring the etching rate at each of the peripheral and central portions of the first target film by monitoring a waveform of film interference light resulting from the interference of first reflected light composed of plasma light incident upon and reflected from a surface of the first target film and second reflected light composed of the plasma light incident upon the surface of the first target film, passing through the first target film, and reflected from a surface of the first wafer.

The arrangement ensures easy measurement of the respective etching rates at the peripheral and central portions of the first target film.

A first etching apparatus according to the present invention comprises: a chamber maintained under vacuum; a sample stage provided in the chamber to carry a wafer formed with a target film to be etched; etching-rate measuring means for measuring an etching rate at each of peripheral and central portions of the target film; gas introducing means for introducing reactive gas into the chamber; a plasma source for changing the reactive gas introduced by the gas introducing means and directed to the target film into a plasma; a focus ring positioned around a wafer placed on the sample stage to be vertically movable relative to the sample stage, the focus ring equalizing the distribution of radicals composed of the reactive gas and arriving at the target film; and driving means for vertically moving the focus ring.

In the first etching apparatus according to the present invention, the respective etching rates at the peripheral and central portions of the target film can be measured by the etching-rate measuring means. Since the first etching apparatus comprises the focus ring vertically movable relative to the sample stage and the driving means for vertically moving the focus ring, the quantity of radicals arriving at the peripheral portion of the target film can be increased or decreased by upwardly or downwardly moving the focus ring. Specifically, when the etching rate is higher at the peripheral portion of the first target film than at the central portion thereof, the quantify of radicals arriving at the peripheral portion of the second target film in the etching process can be decreased by upwardly moving the focus ring. Conversely, when the etching rate is lower at the peripheral portion of the first target film than at the central portion thereof, the quantify of radicals arriving at the peripheral portion of the second target film in the etching process can be increased by downwardly moving the focus ring.

By thus upwardly or downwardly moving the focus ring vertically movable relative to the sample stage, the quantity of radicals arriving at the peripheral portion of the target film in the etching process can be increased or reduced, which ensures easy achievement of a uniform etching rate at the target film.

A second etching apparatus according to the present invention comprises: a chamber maintained under vacuum; a sample stage provided in the chamber to carry a wafer formed with a target film to be etched; etching-rate measuring means for measuring an etching rate at each of peripheral and central portions of the target film; gas introducing means for introducing reactive gas into the chamber; gas-amount control means for increasing or decreasing the respective amounts of the reactive gas introduced by the gas introducing means and directed to the peripheral and central portions of the target film; and a plasma source for changing the reactive gas introduced by the gas introducing means and directed to the target film into a plasma.

As mentioned above, the second etching apparatus according to the present invention comprises the gas-amount control means for increasing and decreasing the respective amounts of reactive gas directed to the peripheral and central portions of the target film in the etching process. When the etching rate is higher at the peripheral portion of the first target film than at the central portion thereof, the amount of reactive gas directed to the peripheral portion of the second target film in the etching process is decreased or the amount of reactive gas directed to the central portion thereof is increased, whereby the quantity of radicals arriving at the central potion of the second target film in the etching process is relatively increased compared with the quantity of radicals arriving at the central portion of the first target film in the etching process. Conversely, when the etching rate is lower at the peripheral portion of the first target film than at the central portion thereof, the amount of reactive gas arriving at the peripheral portion of the second target film in the etching process is increased or the amount of reactive gas arriving at the central portion thereof is decreased, whereby the quantity of radicals arriving at the peripheral portion of the second target film in the etching process is relatively increased compared with the quantity of radicals arriving at the peripheral portion of the first target film in the etching process.

By thus increasing or decreasing the amount of reactive gas directed to the peripheral or central portion of the target film being etched, the quantity of radicals arriving at the peripheral or central portion of the target film in the etching process can be increased or reduced, which ensures easy achievement of a uniform etching rate at the target film.

DETAILED DESCRIPTION OF THE INVENTION

First Embodiment

Figure 1:
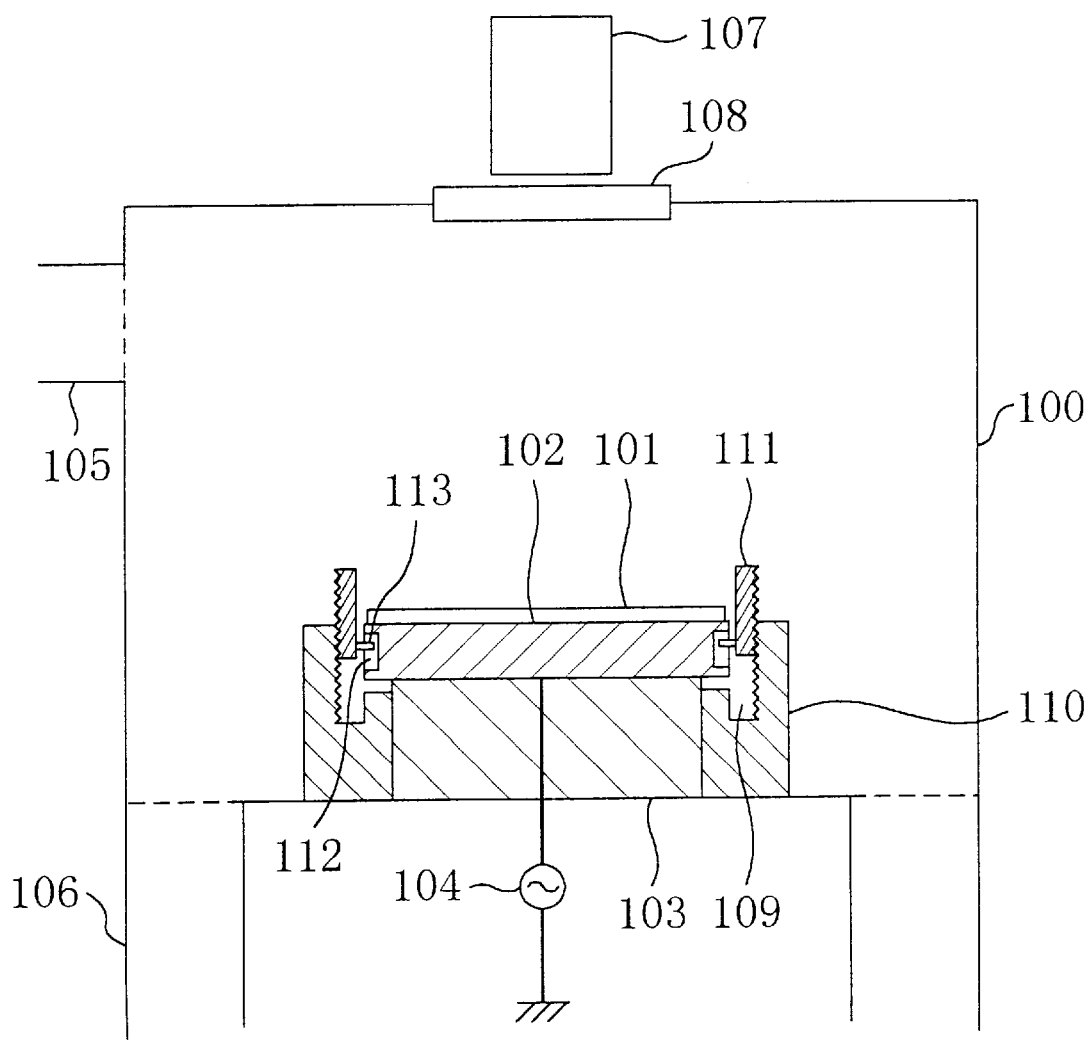
FIG. 1 is a schematic cross-sectional view of an etching apparatus according to a first embodiment of the present invention.
Figure 2:
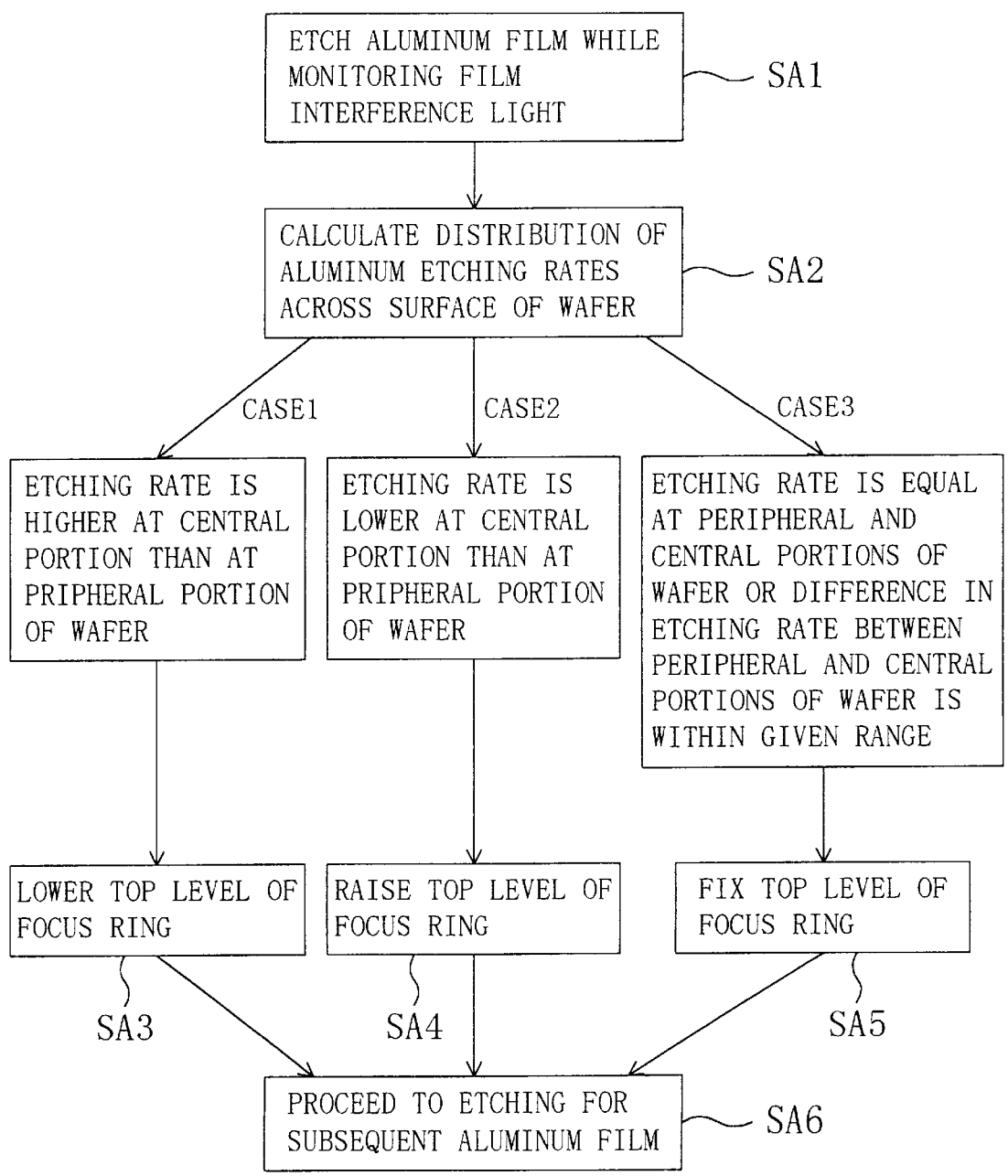
FIG. 2 is a flow chart illustrating an etching method according to the first embodiment.

FIG. 1 shows the schematic structure of an etching apparatus according to a first embodiment of the present invention. A chamber 100 maintained under vacuum is internally provided with a sample stage for carrying a wafer as a sample to be etched and with a support 103 for supporting the sample stage 102. For example, RF power of 13.56 MHz is applied from an RF power source 104 to the sample stage 102, which also serves as a lower electrode. The chamber 100 is formed with a gas inlet 105 for introducing reactive gas into the chamber 100 and a gas outlet 106 for exhausting the gas from the chamber 100.

The first embodiment is characterized in that a CCD camera 107 for monitoring the surface state of a silicon wafer 101 placed on the sample stage 102 and a quartz plate 108 for preventing the attachment of the reactive gas to the CCD camera 107 are provided in the upper part of the chamber 100.

A cylindrical member 110 having an annular groove 109 is provided outside the support 103 to be rotatable relative to the support 103. The cylindrical member 110 is rotated by driving means such as a motor (not shown). A focus ring 111 is provided within the groove 109 of the cylindrical member 110 to be vertically movable relative to the cylindrical member 110. Specifically, the inner surface of the groove 109 of the cylindrical member 110 and the outer circumferential surface of the focus ring 111 are formed with respective threaded portions to be engaged with each other. The focus ring 111 is rotatable as well as vertically movable relative to the cylindrical member 110. The outer surface of the sample stage 102 is formed with several vertically elongated recessed portions 112, while the inner circumferential surface of the focus ring 111 is formed with projecting portions 113 that fit into the vertically elongated recessed portions 112. The focus ring 111 is not rotatable but vertically movable relative to the sample stage 102. In the foregoing arrangement, the focus ring 111 is threadedly engaged with the cylindrical member 110 and not rotatable relative to the sample stage 102 so that, when the cylindrical member 110 is rotated by the driving means (not shown), the focus ring 110 moves upward or downward with no rotation.

Referring to FIG. 1, FIG. 2, and FIGS. 3(a) and 3(b), a description will be given to an etching method whereby an aluminum film as a target film formed on the wafer placed on the sample stage 102 is etched by using the etching apparatus according to the first embodiment.

First, in a step SA1, the aluminum film is etched while the waveform of film interference light resulting from the interference of first reflected light from the aluminum film and second reflected light from the silicon substrate is monitored by the CCD camera 107.

Figure 3A:
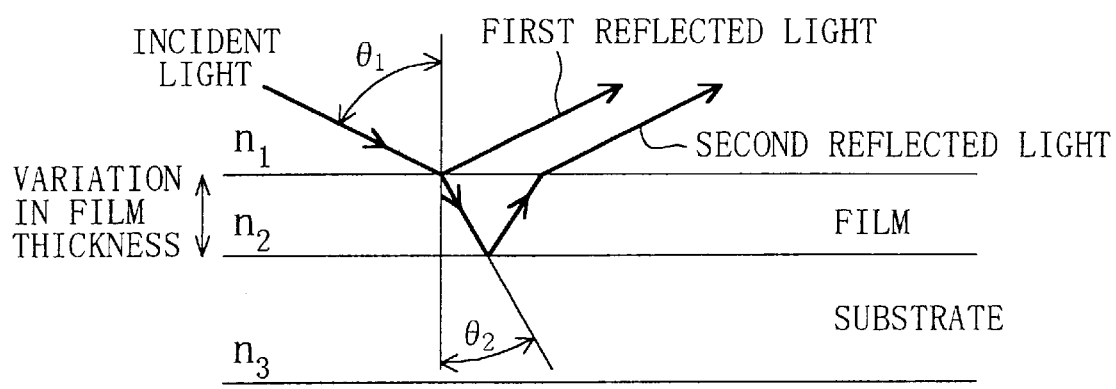
FIGS. 3(a) and 3(b) illustrate a method of monitoring film interference light by the etching method according to the first or second embodiment of the present invention.
Figure 3B:
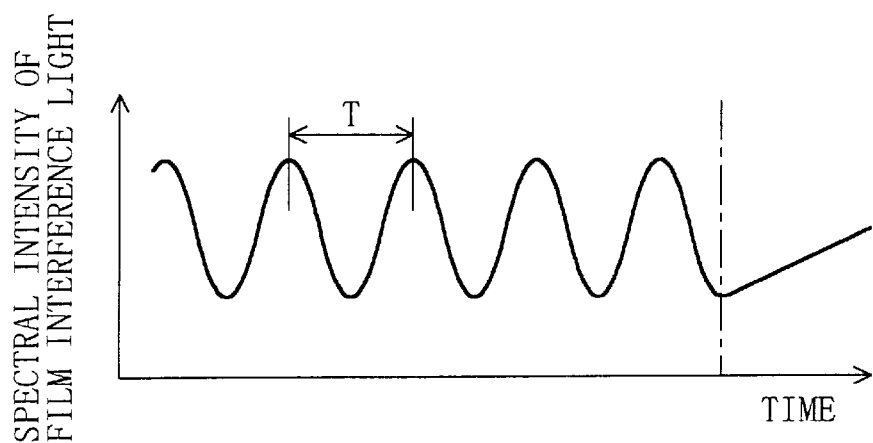

FIG. 3(a) illustrates the film interference light resulting from the interference of the first reflected light from the film formed on the substrate and the second reflected light from the substrate. Incident light at an angle of incidence $\theta_1$ is reflected from a surface of the film to form the first reflected light. The incident light also passes through the film as refracted light having an angle of refraction $\theta_2$ and is reflected from a surface of the substrate to form the second reflected light. In FIG. 3(a), the respective refractive indices of air, the film, and the substrate are designated at $n_1$, $n_2$, and $n_3$. As shown in FIG. 3(b), the waveform of the spectral intensity of the film interference light has a period T corresponding to a variation in film thickness. Since the incident light (plasma light) is reflected from the aluminum film and wafer to form the first and second reflected light which interferes with each other to produce the film interference light, it can be judged whether the etching rate for the aluminum film formed on the wafer is high or low by measuring the wavelength of the spectral intensity of the film interference light.

In a step SA2, the distribution of etching rates across the surface of the wafer is detected. Specifically, data indicating the waveform of the film interference light detected by the CCD camera 107 is inputted to an in-situ monitoring device commercially available from LEYBOLD INFICON Co. (U.S.A) (former LOW ENTROPY SYSTEMS Co.) so that it determines, based on the inputted data, which is the higher of the etching rate at the central portion of the wafer and the etching rate at the peripheral portion thereof.

A description will be given to methods of judging whether the etching rate is higher or lower based on the data indicating the waveform of the film interference light.

During the progress of etching, the spectral intensity of the film interference light presents the waveform of a regular sign wave as shown in the left part of the dash-dot line of FIG. 3(b), since the first and second reflected light interferes with each other to form the film interference light. After the completion of etching, however, the spectral intensity presents a monotonous waveform as shown in the right part of the dash-dot line of FIG. 3(b), since the film interference light is no more formed.

In accordance with the first method, therefore, the respective etching rates at the central and peripheral portions of the aluminum film are calculated by dividing the thickness of the aluminum film by the etching time between the initiation and completion of etching performed with respect to the aluminum film. From comparison between the respective etching rates calculated, it is judged which is the higher of the etching rate at the central portion of the aluminum film and the etching rate at the peripheral portion thereof. In the case where the aluminum film has the same thickness at the central and peripheral portion thereof, the first method allows easy comparison between the etching rate at the central portion and the etching rate at the peripheral portion.

In accordance with the second method, it is judged whether the etching rate is higher at the central portion of the aluminum film or at the peripheral portion thereof from comparison between the mean values of the periods T of sign waves in respective regions of the central and peripheral portions of the aluminum film where the spectral intensity of the film interference light presents a regular waveform. Specifically, if the period $T_1$ of the waveform of the spectral intensity at the central portion of the aluminum film is shorter than the period $T_2$ of the waveform of the spectral intensity at the peripheral portion thereof, it is judged that the etching rate is higher at the central portion than at the peripheral portion. Conversely, if the period $T_1$ of the waveform of the spectral intensity at the central portion of the aluminum film is longer than the period $T_2$ of the waveform of the spectral intensity at the peripheral portion thereof, it is judged that the etching rate is lower at the central portion than at the peripheral portion. Since a comparison is performed between the mean values of the periods T of sign waves in the regions where the spectral intensity of the film interference light presents a regular waveform, the second method allows precise comparison between the etching rate at the central portion and the etching rate at the peripheral portion.

In the case where the etching rate is higher at the central portion of the aluminum film (wafer) than at the peripheral portion thereof (case 1), the cylindrical member 110 is rotated in a step SA3 to move the focus ring 111 downward, while the wafer on the sample stage 102 is replaced with another wafer to be etched subsequently. This lowers the top level of the focus ring 111 and increases the quantity of reactive radicals (chlorine radicals) supplied to the peripheral portion of the aluminum, resulting in the etching rate increased at the peripheral portion of the aluminum film. Consequently, an equal etching rate is achieved at the peripheral and central portions of the aluminum film.

In the case where the etching rate is lower at the central portion of the aluminum film (wafer) than at the peripheral portion thereof (case 2), the cylindrical member 110 is rotated in a step SA4 to move the focus ring 111 upward, while the wafer on the sample stage 102 is replaced with another wafer to be etched subsequently. This raises the top level of the focus ring 111 and decreases the quantity of reactive radicals (chlorine radicals) supplied to the peripheral portion of the aluminum film, resulting in the etching rate decreased at the peripheral portion of the aluminum film. Consequently, an equal etching rate is achieved at the peripheral and central portions of the aluminum film.

In the case where an equal etching rate is achieved at each of the peripheral and central portions of the aluminum film or a difference in etching rate between the peripheral and central portions of the aluminum film is within a given range (case 3), the top level of the focus ring 111 is unchanged in a step SA5, so that the respective etching rates at the peripheral and central portions of the aluminum film are also unchanged.

Next, in a step SA6, the current etching process proceeds to the subsequent etching process for an aluminum film formed on the wafer to be etched subsequently. In the subsequent etching process also, a comparison is made between the etching rates to determine which one of the cases 1 to 3 is valid and the top level of the focus ring 111 is controlled to realize the case 3.

Table 3 shows the relationship between the etching rates at the peripheral and central portions of the aluminum film (wafer) and the uniformity of the etching rate in each of the cases 1 to 3. When the case 3 is valid, the uniformity of the etching rate is ±3.9%. As for the etching conditions, they are the same as shown in Table 1.

TABLE 3

| | CASE | | |
|---|---|---|---|
| ETCHING | WHEN VERTICAL POSITION OF FOCUS RING IS OPTIMIZED | WHEN FOCUS RING IS LOWER THAN OPIMUM LEVEL | WHEN FOCUS RING IS HIGHER THAN OPTIMUM LEVEL |
| ETCHING RATE | | | |
| PERIPHERAL PORTION | 750 nm/min | 800 nm/min | 700 nm/min |
| CENTRAL PORTION | 750 nm/min | 720 nm/min | 780 nm/min |
| UNIFORMITY OF ETCHING RATE | ±3.9% | ±8.7% | ±8.5% |

Although the first embodiment has changed the etching rates at the peripheral and central portions of the aluminum film by changing the top level of the focus ring 111, it is also possible to change the etching rates at the peripheral and central portions of the aluminum film by changing the configuration of the tip portion of the focus ring 111.

Second Embodiment

Figure 4:
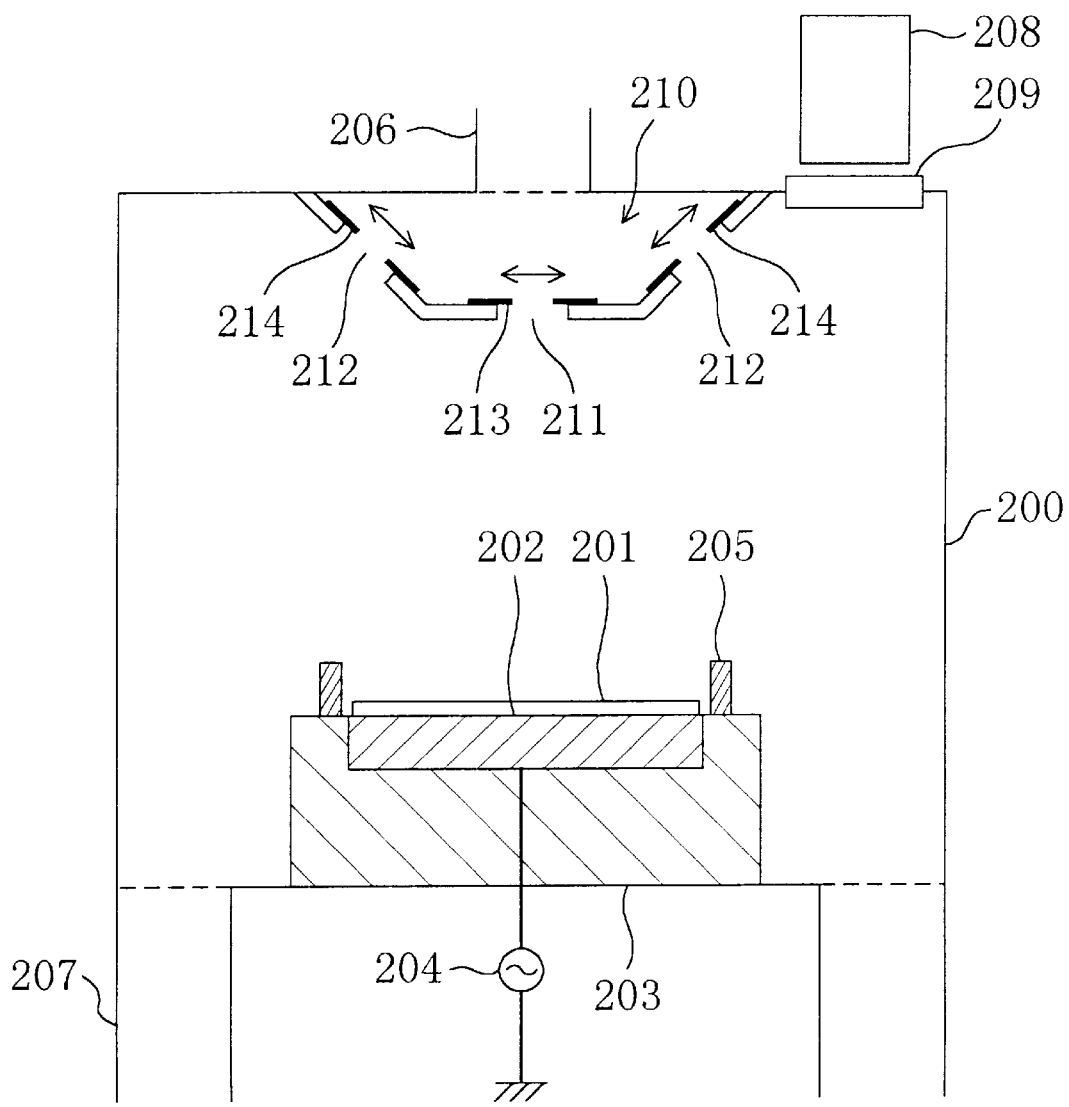
FIG. 4 is a schematic cross-sectional view of an etching apparatus according to the second embodiment.
Figure 5:
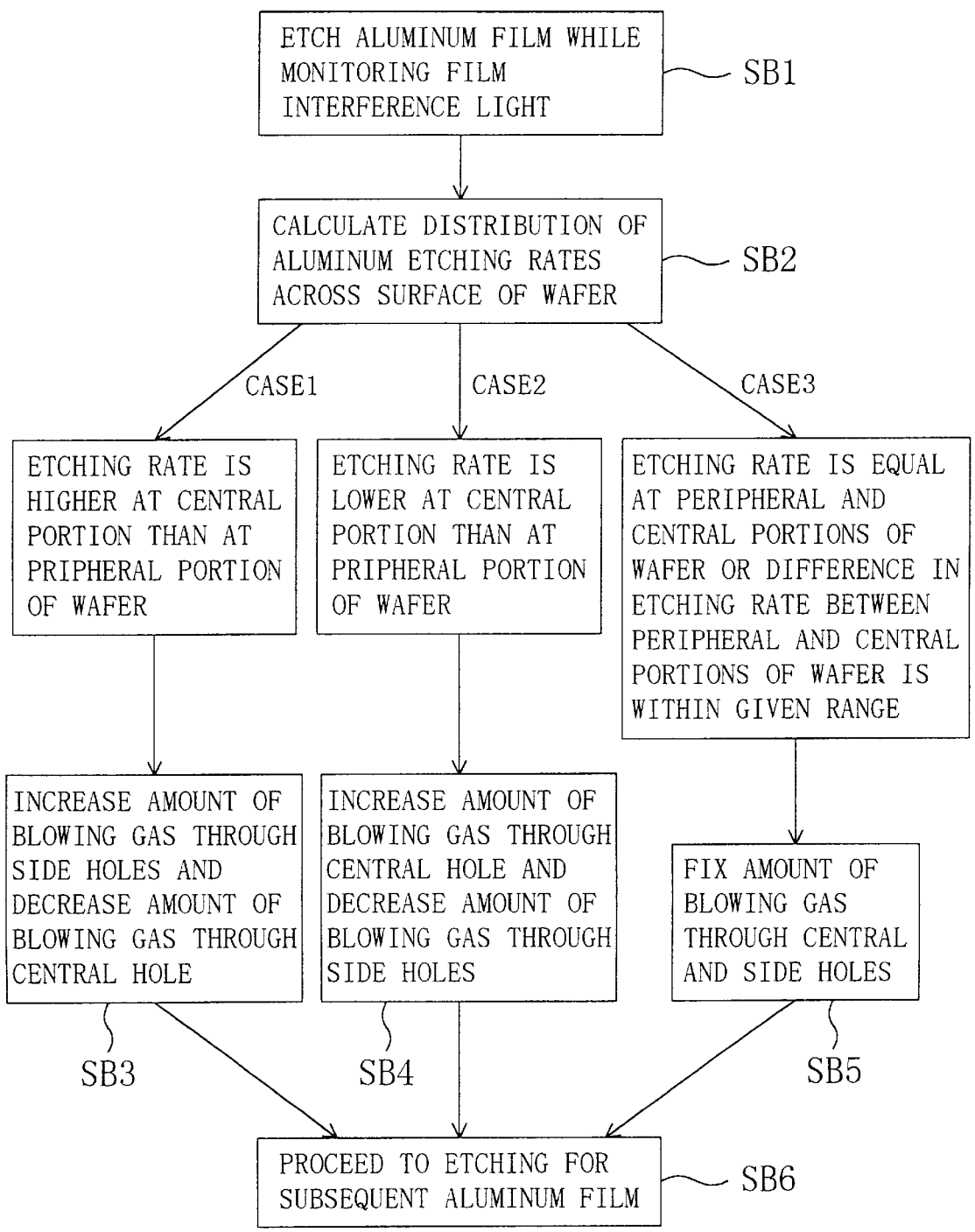
FIG. 5 is a flow chart illustrating an etching method according to the second embodiment.
Figure 6A:
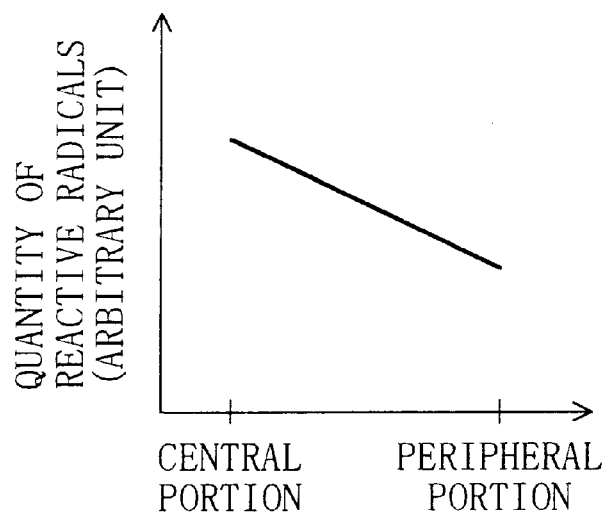
FIG. 6(a) is a conceptual view illustrating the case where the etching rate is higher at the central portion of an aluminum film than at the peripheral portion thereof and FIG. 6(b) is a conceptual view illustrating a method of relatively increasing the quantity of reactive radicals supplied to the peripheral portion of the aluminum film.
Figure 6B:
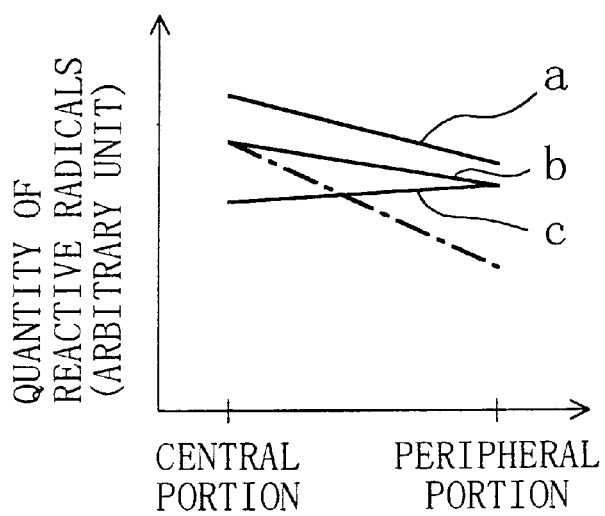
Figure 7A:
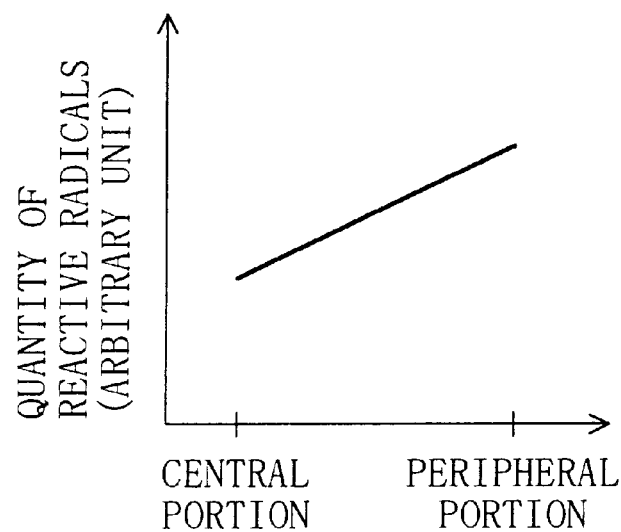
FIG. 7(a) is a conceptual view illustrating the case where the etching rate is lower at the central portion of an aluminum film than at the peripheral portion thereof and FIG. 7(b) is a conceptual view illustrating a method of relatively increasing the quantity of reactive radicals supplied to the central portion of the aluminum film.
Figure 7B:
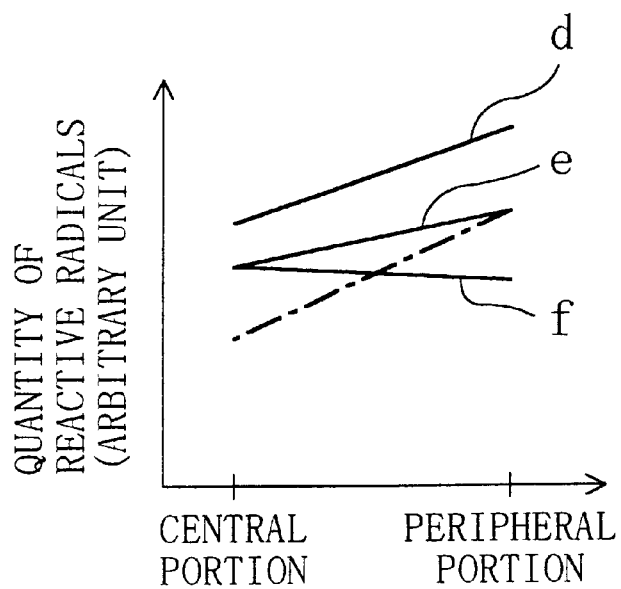
Figure 8:
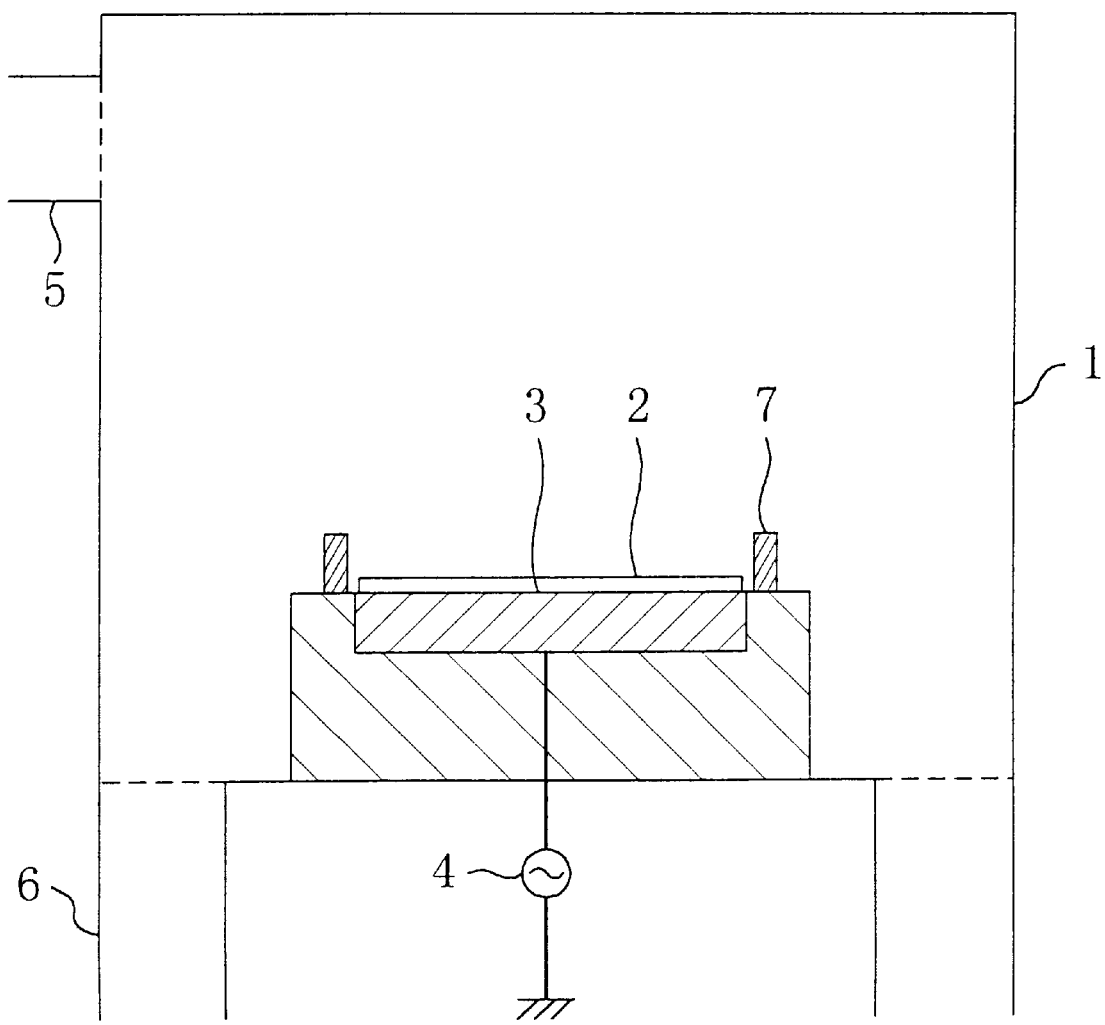
FIG. 8 is a schematic cross-sectional view of a conventional etching apparatus.
Figure 9A:
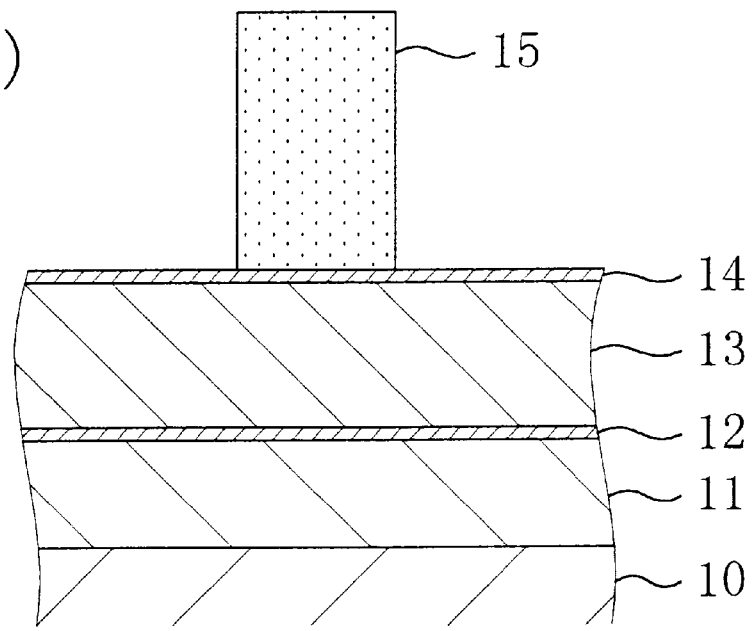
FIGS. 9(a) and 9(b) are cross-sectional views illustrating a conventional etching method.
Figure 9B:
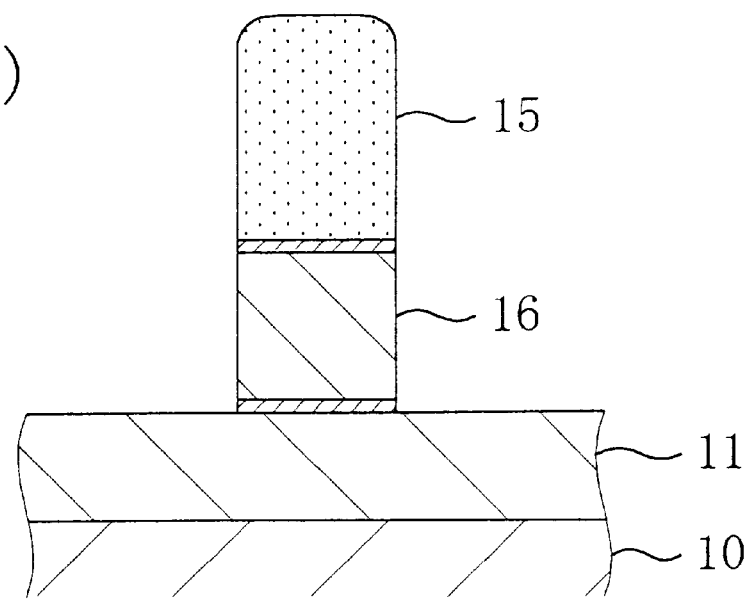

FIG. 4 shows the schematic structure of an etching apparatus according to a second embodiment of the present invention. A chamber 200 maintained under vacuum is internally provided with a sample stage 202 for carrying a wafer 201 as a sample to be etched and a support 203 for supporting the sample stage 202. For example, RF power of 13.56 MHz is applied from an RF power source 204 to the sample stage 202, which also serves as a lower electrode. The same focus ring 205 as used conventionally is provided on the sample stage 202. The chamber 200 is formed with a gas inlet 206 for introducing reactive gas into the chamber 200 and a gas outlet 207 for exhausting the gas from the chamber 200.

The second embodiment is characterized in that a CCD camera 208 for monitoring the surface state of a wafer 201 placed on the sample stage 202 and a quartz plate 209 for preventing the attachment of the reactive gas to the CCD camera 208 are provided in the upper part of the chamber 200.

In the upper part of the chamber, there is also provided gas-amount control means 210 for controlling the amount of gas blowing through the gas inlet 206. The gas-amount control means 210 has: a central hole 211 formed in the bottom portion thereof; a plurality of side holes 211 formed in the side portions thereof; a bottom shutter 213 for controlling the amount of gas blowing through the central hole 211; and a plurality of side shutters 214 for controlling the amount of gas blowing through the side holes 211. By controlling the degree of openness of the bottom shutter 13, the amount of reactive gas blowing through the central hole 211 is changed. By controlling the degree of openness of the side shutters 14, the amount of reactive gas blowing through the side holes 211 is changed.

Referring to FIGS. 4 to 7, a description will be given to an etching method whereby an aluminum film formed on the wafer 201 placed on the sample stage 202 is etched by using the etching apparatus according to the second embodiment.

First, in a step SB1, the aluminum film is etched by monitoring the waveform of film interference light resulting from the interference of first reflected light from the aluminum film and second reflected light from the wafer by means of the CCD camera 208.

Next, in a step SB2, the distribution of etching rates across the surface of the wafer is detected so that it is determined which is the higher of the etching rate at the central portion of the aluminum film and the etching rate at the peripheral portion thereof, similarly to the first embodiment.

Next, in the case where the etching rate is higher at the central portion of the aluminum film (wafer) than at the peripheral portion thereof (case 1), the amount of gas (quantity of reactive radicals) blowing through the side holes 211 is relatively increased and the amount of gas (quantity of reactive radicals) blowing through the central hole 211 is relatively decreased in a step SB3, while the current wafer on the sample stage 202 is replaced with another wafer to be etched subsequently. Specifically, the quantity of radicals directed to each of the peripheral and central portions of the aluminum film is increased, while reactive radicals larger in quantity are directed to the peripheral portion than those directed to the central portion, as indicated by the line a of FIG. 6(*b*). Alternatively, the quantity of reactive radicals directed to the peripheral portion of the aluminum film is increased without changing the quantity of reactive radicals directed to the central portion thereof, as indicated by the line b, or the quantity of reactive radicals directed to the peripheral portion of the aluminum film is increased, while the quantity of reactive radicals directed to the central portion thereof is decreased, as indicated by the line c.

Consequently, the quantity of reactive radicals supplied to the peripheral portion of the aluminum film and the etching rate at the peripheral portion thereof are relatively increased, resulting in an equal etching rate achieved at each of the peripheral and central portions of the aluminum film.

In the case where the etching rate is lower at the central portion of the aluminum film (wafer) than at the peripheral portion thereof (case 2), the amount of gas (quantity of reactive radicals) blowing through the side holes 211 is relatively decreased and the amount of gas (quantity of reactive radicals) blowing through the central hole 211 is relatively increased, while the wafer on the sample stage 202 is replaced with another wafer to be etched subsequently. Specifically, the quantity of radicals directed to each of the peripheral and central portions of the aluminum film is increased, while reactive radicals larger in quantity are directed to the central portion than those directed to the peripheral portion, as indicated by the line d of FIG. 7(b). Alternatively, the quantity of reactive radicals directed to the central portion of the aluminum film is increased without changing the quantity of reactive radicals directed to the peripheral portion thereof, as indicated by the line e, or the quantity of reactive radicals directed to the central portion of the aluminum film is increased, while the quantity of reactive radicals directed to the peripheral portion thereof is decreased, as indicated by the line f.

Consequently, the quantity of reactive radicals supplied to the central portion of the aluminum film and the etching rate at the central portion thereof are relatively increased, resulting in an equal etching rate achieved at each of the peripheral and central portions of the aluminum film.

In the case where an equal etching rate is achieved at each of the peripheral and central portion of the aluminum film (wafer) or a difference in etching rate between the peripheral and central portions of the aluminum film is within a given range (case 3), the amount of gas (quantity of radicals) blowing through the side holes 211 and the amount of gas (quantity of radicals) blowing through the central hole 211 are unchanged in a step SB5. Accordingly, the etching rate is unchanged at each of the peripheral and central portions of the aluminum film.

Next, in a step SB6, the current etching process proceeds to the subsequent etching process for another aluminum film formed on the wafer to be etched subsequently. In the subsequent etching process also, a comparison is made between the etching rates to determine which one of the cases 1 to 3 is valid and the respective amounts of gas blowing through the side holes 211 and through the central hole 211 are controlled to realize the case 3.

Table 4 shows the relationship between the etching rates at the peripheral and central portions of the aluminum film (wafer) and the uniformity of the etching rate in each of the cases 1 to 3 according to the second embodiment. When the case 3 is valid, the uniformity of the etching rate is ±3.9%. As for the etching conditions, they are the same as shown in Table 1.

wire composed of a metal alloy film such as an aluminum film, the etching process is improved in processing accuracy and reproducibility to implement micro-fabrication for finer features. This reduces variations in wiring resistance, wiring delay time, and the like across the surface of the wafer or chip, resulting in a semiconductor device with improved properties.

Although the first embodiment has controlled only the vertical position of the focus ring and the second embodiment has controlled only the amount of blowing reactive gas, it is also possible to control both the vertical position of the focus ring and the amount of blowing reactive gas.

Although the first and second embodiment have used the RIE apparatus, it will be understood that the similar effects can be achieved by using an ICP (Inductively-Coupled-Plasma) etching apparatus or an ECR (Electron-Cyclotron-Resonance) etching apparatus instead. In the case of using the ECR etching apparatus, the respective etching rates at the peripheral and central portions of the aluminum film are changed by changing the size and position of a slot antenna, so that the uniformity of the etching rate is improved.

Although the first and second embodiment have described the etching processes each performed with respect to the metal alloy film composed of the aluminum film, it will be appreciated that the present invention is also applicable to an etching process performed with respect to a silicon-based film such as a silicon oxide film or polysilicon film formed on a wafer.

We claim:

1. An etching method for sequentially etching target films formed on respective wafers by using a plasma, comprising:

an etching-rate measuring step of measuring an etching rate at each of peripheral and central portions of the first target film formed on the first wafer; and a radical-quantity controlling step of controlling a quantity of radicals by increasing the quantity of radicals arriving at a central portion of the second target film formed on the second wafer to be etched subsequently to said first wafer or decreasing the quantity of radicals arriving at a peripheral portion of said second target film when the etching rate is higher at the peripheral portion of said first target film than at the central portion thereof or controlling the quantity of radicals by decreasing the quantity of radicals arriving at the

TABLE 4

| | CASE | | |
|---|---|---|---|
| ETCHING | WHEN AMOUNT OF BLOWING GAS IS OPTIMIZED AT EACH OF PERIPHERAL AND CENTRAL PORTIONS | WHEN AMOUNT OF BLOWING GAS IS LARGER AT PERIPHERAL PORTION AND SMALLER AT CENTRAL PORTION | WHEN AMOUNT OF BLOWING GAS IS LARGER AT CENTRAL PORTION AND SMALLER AT PERIPHERAL PORTION |
| ETHCING RATE | | | |
| PERIPHERAL PORTION | 750 nm/min | 810 nm/min | 710 nm/min |
| CENTRAL PORTION | 750 nm/min | 710 nm/min | 790 nm/min |
| UNIFORMITY OF ETCHING RATE | ±3.9% | ±8.8% | ±8.4% |

If the etching method according to the first or second embodiment is applied to a dry-etching process for a metal central portion of said second target film or increasing the quantity of radicals arriving at the peripheral portion of said second target film when the etching rate is lower at the peripheral portion of said first target film than at the central portion thereof.

2. An etching method according to claim 1, wherein said radical-quantity controlling step comprises the step of decreasing the quantity of radicals arriving at the peripheral portion of said second target film by upwardly moving a focus ring positioned around said second wafer to be vertically movable relative to said second wafer when the etching rate is higher at the peripheral portion of said first target film than at the central portion thereof.

3. An etching method according to claim 1, wherein said radical-quantity controlling step comprises the step of increasing the quantity of radicals arriving at the peripheral portion of said second target film by downwardly moving a focus ring positioned around said second wafer to be vertically movable relative to said second wafer when the etching rate is lower at the peripheral portion of said first target film than at the central portion thereof.

4. An etching method according to claim 1, wherein said radical-quantity controlling step comprises at least one of the steps of decreasing the quantity of radicals arriving at the peripheral portion of said second target film by decreasing the amount of reactive gas arriving at the peripheral portion of said second target film and increasing the quantity of radicals arriving at the central portion of said second target film by increasing the amount of reactive gas arriving at the central portion of said second target film when the etching rate is higher at the peripheral portion of said first target film than at the central portion thereof.

5. An etching method according to claim 1, wherein said radical-quantity controlling step comprises at least one of the steps of increasing the quantity of radicals arriving at the peripheral portion of said second target film by increasing the amount of reactive gas arriving at the peripheral portion of said second target film and decreasing the quantity of radicals arriving at the central portion of said second target film by decreasing the amount of reactive gas arriving at the central portion of said second target film when the etching rate is lower at the peripheral portion of said first target film than at the central portion thereof.

6. An etching method according to claim 1, wherein said etching-rate measuring step comprises the step of measuring the etching rate at each of the peripheral and central portions of said first target film by monitoring a waveform of film interference light resulting from the interference of first reflected light composed of plasma light incident upon and reflected from a surface of said first target film and second reflected light composed of the plasma light incident upon the surface of said first target film, passing through said first target film, and reflected from a surface of said first wafer.

7. An etching apparatus comprising:

a chamber maintained under vacuum;

a sample stage provided in said chamber to carry a wafer formed with a target film to be etched;

etching-rate measuring means for measuring an etching rate at each of peripheral and central portions of said target film;

gas introducing means for introducing reactive gas into said chamber;

a plasma source for changing the reactive gas introduced by said gas introducing means and directed to said target film into a plasma;

a focus ring positioned around a wafer placed on said sample stage to be vertically movable relative to said sample stage, said focus ring equalizing the distribution of radicals composed of said reactive gas and arriving at said target film; and driving means for vertically moving said focus ring.

8. An etching apparatus comprising:

a chamber maintained under vacuum;

a sample stage provided in said chamber to carry a wafer formed with a target film to be etched;

etching-rate measuring means for measuring an etching rate at each of peripheral and central portions of said target film;

gas introducing means for introducing reactive gas into said chamber;

gas-amount control means for increasing or decreasing the respective amounts of the reactive gas introduced by said gas introducing means and directed to the peripheral and central portions of said target film; and a plasma source for changing the reactive gas introduced by said gas introducing means and directed to said target film into a plasma.

* * * * *